(12) United States Patent
Fabris et al.

(10) Patent No.: US 7,580,868 B2
(45) Date of Patent: Aug. 25, 2009

(54) SYSTEMS, METHODS, AND COMPUTER PROGRAM PRODUCTS FOR DETERMINING RANKINGS OF PRODUCT PROVIDERS DISPLAYED VIA A PRODUCT SOURCE SYSTEM

(75) Inventors: Andres Fabris, West Palm Beach, FL (US); Lynne MacLean, North Palm Beach, FL (US); Laura Mesa, North Palm Beach, FL (US)

(73) Assignee: Travelocity.com LP, Southlake, TX (US)

( * ) Notice: Subject to any disclaimer, the term of this patent is extended or adjusted under 35 U.S.C. 154(b) by 596 days.

(21) Appl. No.: 11/232,064

(22) Filed: Sep. 21, 2005

(65) Prior Publication Data

US 2007/0067225 A1    Mar. 22, 2007

(51) Int. Cl.
*G06Q 30/00* (2006.01)
(52) U.S. Cl. ............................. 705/26; 705/1; 705/14; 705/27; 705/37; 705/38; 705/400; 707/5; 707/207
(58) Field of Classification Search ................ 705/1, 705/14, 26, 27, 37, 38; 707/5, 207, 201
See application file for complete search history.

(56) References Cited

U.S. PATENT DOCUMENTS

| | | | |
|---|---|---|---|
| 2003/0130908 A1* | 7/2003 | Hing | 705/26 |
| 2004/0044615 A1* | 3/2004 | Xue et al. | 705/38 |
| 2004/0128196 A1* | 7/2004 | Shibuno | 705/14 |
| 2005/0192958 A1* | 9/2005 | Widjojo et al. | 707/5 |
| 2006/0047598 A1* | 3/2006 | Hansen | 705/37 |
| 2006/0265429 A1* | 11/2006 | Pendergast et al. | 707/201 |
| 2007/0156677 A1* | 7/2007 | Szabo | 707/5 |
| 2007/0179791 A1* | 8/2007 | Ramesh et al. | 705/1 |

* cited by examiner

*Primary Examiner*—Yogesh C Garg
(74) *Attorney, Agent, or Firm*—Alston & Bird LLP

(57) ABSTRACT

The present invention generates a ranked display listing of product providers (such as hotels) in response to a user query wherein the rank is generated based upon a performance factor determined by the system. The invention generates the performance factor based on the popularlity of a given product provider as indicated by the number of transactions occurring between users and the product provider. The performance factor may also be based on the relative economic performance of the various product providers such that the system may display product providers in an order that is based on on a combination of the relative popularity and the relative economic performance of the product providers as measured over a selected period.

36 Claims, 5 Drawing Sheets

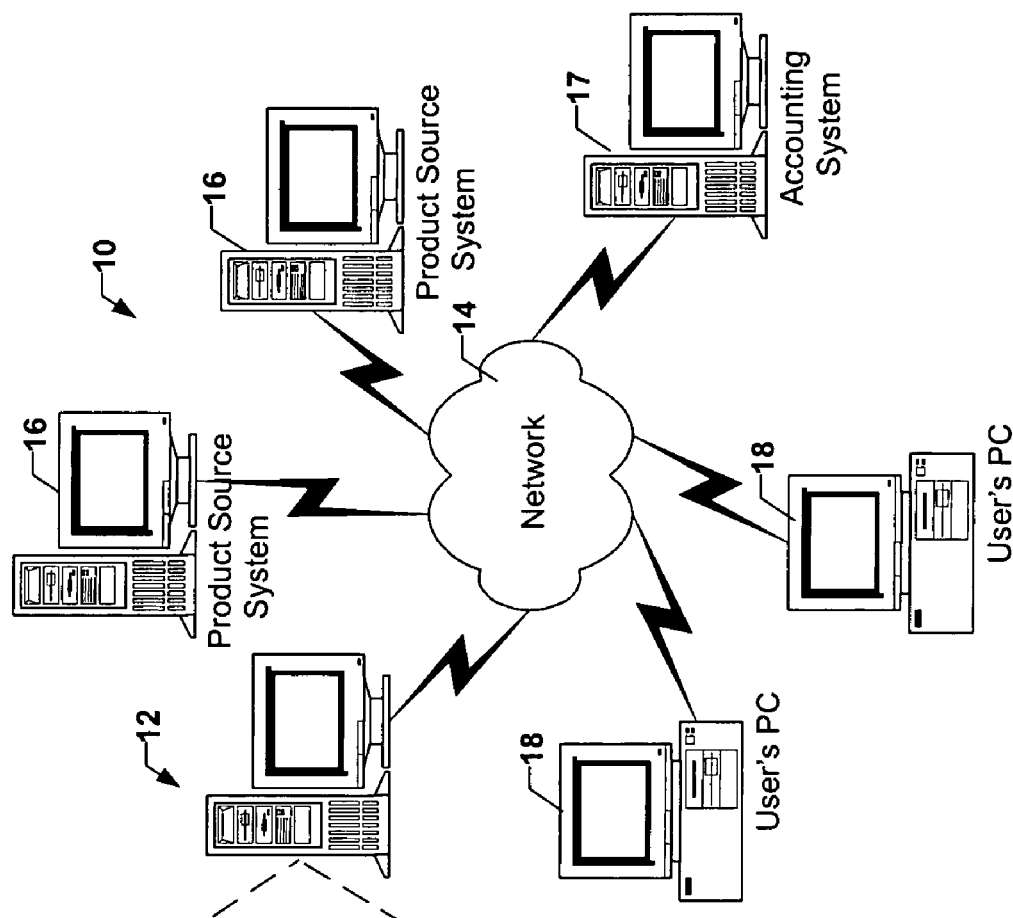
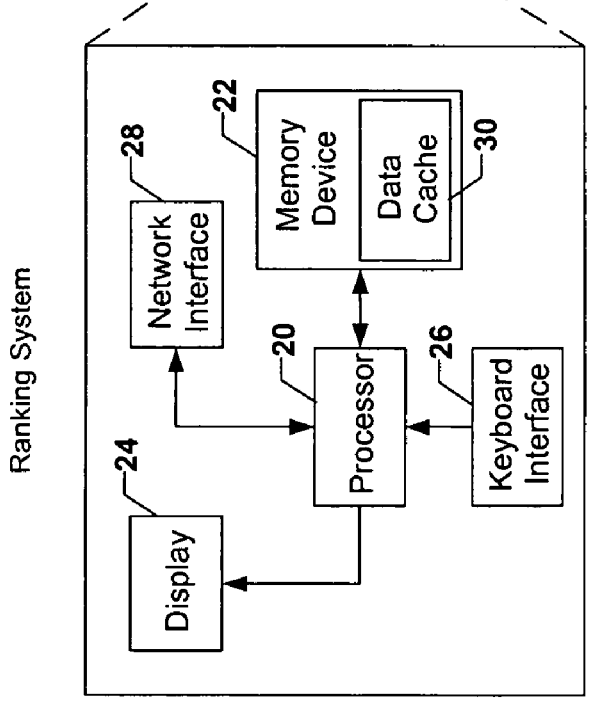

US 7,580,868 B2

SYSTEMS, METHODS, AND COMPUTER PROGRAM PRODUCTS FOR DETERMINING RANKINGS OF PRODUCT PROVIDERS DISPLAYED VIA A PRODUCT SOURCE SYSTEM

BACKGROUND OF THE INVENTION

1. Field of the Invention

The present invention relates to the field of computerized inventory systems, such as hotel reservations systems or other product and/or service reservation or inventory systems, which are used to determine and relay listings of product providers and products and services offered by selected product providers to customers. More particularly, the systems, methods, and computer program products of the present invention relate to determining the order in which product providers are displayed by the computerized inventory system by determining a performance factor for each product provider and using the performance factor to assign a display rank to each product provider.

2. Description of Related Art

Many of today's products and services are catalogued in computerized reservation or inventory systems. These systems may include simple or complex methodologies for maintaining inventory and providing product and/or service availability information. Either via direct access or remote access across a network, consumers can run queries and view product availability information for selected products and/or services, as well as purchase or reserve such items. Product availability information is often displayed via a listing of product providers (such as hotels) offering products meeting the query requirements. One example of such systems is a computerized reservation system (CRS). A CRS provides a communications network for travel agents and other consumers to access travel related information such as airline tickets, hotel reservations, car rentals, event tickets, leisure activities, etc. CRS systems have been in existence for a long period of time. Some of the current CRS systems are known or referred to under the following trade names and services marks: SABRE, AMADEUS, WORLDSPAN, SYSTEM ONE, APOLLO, GEMINI, GALILEO, and AXESS.

Consumer interaction with such systems has become more complex in recent years, thus introducing a host of technical problems related to the tracking of trends in transactions occurring via search systems that may be in communication with one or more CRS entities, a plurality of users, and individual product providers. Users may now interrogate multiple CRS entities via websites hosted by search systems that are configured to search for low-cost product options on a variety of CRS systems. For example, there exists a search system configured to provide a plurality of low airline fare prices and different flight itinerary options from various CRS entities for a given departure and return date combination entered by a user, thereby allowing a user to view these different options and make a determination as to which fare and flight itinerary meets their goals. Such a system is described more fully in U.S. Provisional Patent Application Ser. No. 60/573,546, filed on May 21, 2004, entitled, Systems, Methods, and Computer Program Products for Searching and Displaying Low Cost Product Availability Information for a Given Departure-Return Date Combination or Range of Departure-Return Date Combinations; the contents of which are incorporated herein. Such systems may also allow the user to search alternate computerized reservation systems hosted by individual hotels, hotel chains, airlines, or other product providers such that the user may initiate a variety of different transactions with one or more product providers via the search system.

Conventional search systems may provide a listing of product providers (such as hotels, car rental companies and airlines, for example) in response to a user input. Such listings often appear on a display in communication with a user's personal computer or other computer device that is in communication with the search system via a network such as the internet. The display order of such listings often determines which product provider is selected by the user. For example, if several product providers offer a product at a similar price, a user may often select a product provider that is listed nearest the beginning of the list (or on the first page of a multi-page web-page listing) provided by the search system. Search systems providing such listings of product providers generate revenue by either: (1) collecting commissions from product providers on product transactions between users and the product providers that are hosted by the search system, or (2) selling products provided by a product provider via the search system that have been consigned and/or purchased from the product provider at a discount. Thus, it would be advantageous to the operators of a search system to encourage users to initiate transactions with product providers that are popular, profitable, prompt in remitting commission payments to the operators of the search system, and/or provide a more substantial discount when selling product inventory directly to the search system operator for resale to users.

While conventional search systems may determine a ranking or display order for product providers offering a selected product based primarily on price (such that the lowest-cost providers are listed first), such systems do not include a system for compiling data sets corresponding to the relative popularity of different product providers that are listed via the search system or data related to commissions collected from various product providers. Such data may be indicative of the product provider's profitability for the search system. In addition, conventional search systems do not include a system for compiling data sets corresponding to the profitability of utilizing a particular product provider, wherein profitability may be linked to a commission and/or profits from re-selling products that have been consigned and/or purchased from the product providers at a discount. Conventional search systems do not include a system for compiling product provider popularity and profitability data in order to subsequently determine a display ranking for product providers displayed via the search system in response to a user inquiry. Thus, popular and/or profitable product providers may be displayed mid-listing or near the end of a listing generated by a conventional search system if the price of the products provided by such providers are not the least expensive to the user.

This technical problem associated with conventional search systems is especially apparent to the operators of the search system who may wish to encourage transactions between users and product providers that yield the greatest and/or most reliable profit stream. In addition, conventional search systems present additional technical problems to their operators in that they include no operator control provisions such that the operator of the search system may place one or more selected product providers near the beginning of a display listing in response to a user query. For example, in conventional search systems an operator would not be easily able to place a preferred product provider (such as a new provider in need of publicity or exposure to the users of the search system) near the beginning of a display listing in response to a user query.

Therefore, there exists a need for an improved system to solve the technical problems outlined above that are associated with conventional search systems. More particularly, there exists a need for a system configured to be capable of collecting data related to both transactions occuring between users and product providers via a product source system as well as transactions (such as commission payments) occuring between product providers and the operator of the product source system. In addition, there exists a need for a system that is capable of determining a ranking of product providers based upon such data and subsequently generating a display order of product providers based upon the determined ranking. Finally, there also exists a need for a system of the type outlined above that may also incorporate the preferences of the operator of the source system with the collected data to determine the ranking of product providers such that the operator of the system may choose to assign a preferred display position to one or more product providers.

BRIEF SUMMARY OF THE INVENTION

The needs outlined above are met by the present invention which, in various embodiments, also provides a system that overcomes many of the technical problems discussed above, as well other technical problems, with regard to the collection of transaction data by a product source system and the use of such data to rank and selectively display a plurality of product providers offering products that meet the requirements of a user query.

More specifically, the system of the present invention comprises, in one embodiment, a product source system for providing a listing of a plurality of product providers to a plurality of users via a network, wherein the product source system assists in and/or enables transactions between one or more of the plurality of users and one or more of the product providers. In some embodiments, the product source system may also provide a listing of a plurality of product providers to a plurality of users via a network, wherein the product source system enables users to purchase products that have been consigned and/or purchased from the product providers by an operator of the product source system for resale to the users. According to some system embodiments, the product source system may be connected to a plurality of product providers, such that the product source system may be capable of receiving a request for a product from a user and determining a set of product providers that offer the product. The system further comprises a ranking system in communication with the product source system that accesses performance factors associated with at least two of the product providers and assigns a rank for the product providers based on the performance factors. Furthermore, the system also comprises a display in communication with said ranking system for displaying the product providers to users based on the ranking assigned by said ranking system.

In some system embodiments of the present invention, the ranking system may be configured to be capable of summing at least two of the performance score, customer score, and operator-defined value to determine the performance factor. Further, according to other system embodiments, the system further comprises a tracking system for tracking an amount of commissions collected from one or more the plurality of product providers during a selected time period and/or a tracking system for tracking a time period between the time of the transaction and when a commission corresponding to the transaction is collected.

The present invention also includes methods and computer program product embodiments for ranking a plurality of product providers based on performance and displaying product options offered by the plurality of product providers in a ranked order based on a ranking based on performance. The method comprises providing a product source system for providing a listing of a plurality of product providers to a plurality of users via a network. The product source system is configured to assist in transactions between one or more of the plurality of users and one or more of the product providers. The method also comprises accessing performance factors associated with at least two of the product providers and assigning a rank for the product providers based on the performance factors. The performance factors are based on at least a performance score and a customer score. In addition, the method further comprises displaying the product providers to users based on the ranking assigned by said assigning step.

According to various embodiments of the present invention, the performance factors are based on at least a performance score and a customer score. In some embodiments, the performance score may be based on at least one of a number of reservations made via the product source system by the plurality of users with each of the plurality of product providers and a number of inquiries made via the product source system by the plurality of users for each of the plurality of product providers. Furthermore, the customer score may be based on at least one of an amount of commissions collected from one or more of the plurality of product providers during a selected time period and a period of time between the time of the transaction and when a commission corresponding to the transaction is collected. According to some system embodiments, the performance factor may be further based on an operator-defined value.

Other method and computer program product embodiments of the present invention may comprise receiving a request from a user for a product, determining a set of product providers that offer the product, and ranking the set of product providers based on the performance factor, and displaying the product providers to the user based on the ranking.

Thus the systems, methods, and computer program products for ranking a plurality of product providers based on a plurality of performance factors provide solutions to the technical problems inherent in conventional search systems and provide advantages including but not limited to: providing a system that automatically encourages user interaction (such as transactions) with product providers exhibiting strong popularity, profitability, or other economic performance, providing a system that may be tailored to encourage user interaction with any one of a plurality of product providers (such as new vendors or preferred vendors) using an operator-defined value to override or partially influence the ranking of product providers; and providing rankings and corresponding display rankings for product providers that are based on a blend of performance factors, such as collections performance, average time for payment, popularity with users, or other operator-defined factors.

These advantages and others that will be evident to those skilled in the art are provided in the system, method, and computer program product of the present invention.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

FIGS. 1A and 1B illustrate a typical network environment in which the systems, methods, and computer program products may be implemented according to one embodiment of the present invention.

Figure 2:
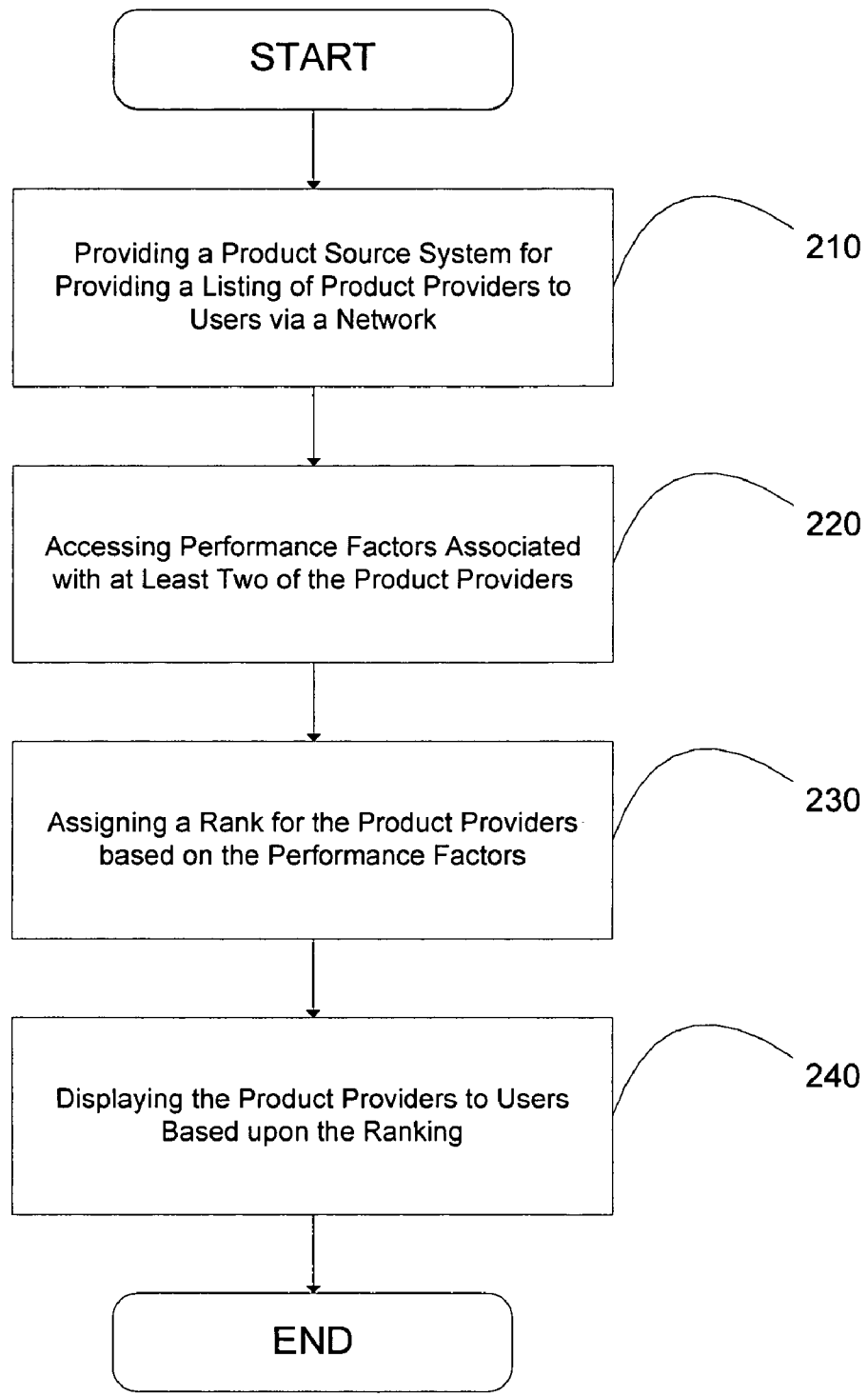

FIG. 2 is an illustration of the operation flow of the systems, methods, and computer program products in response to a user query including providing a product source system, accessing a performance factor, ranking, and display steps, according to one embodiment of the present invention.

Figure 3:
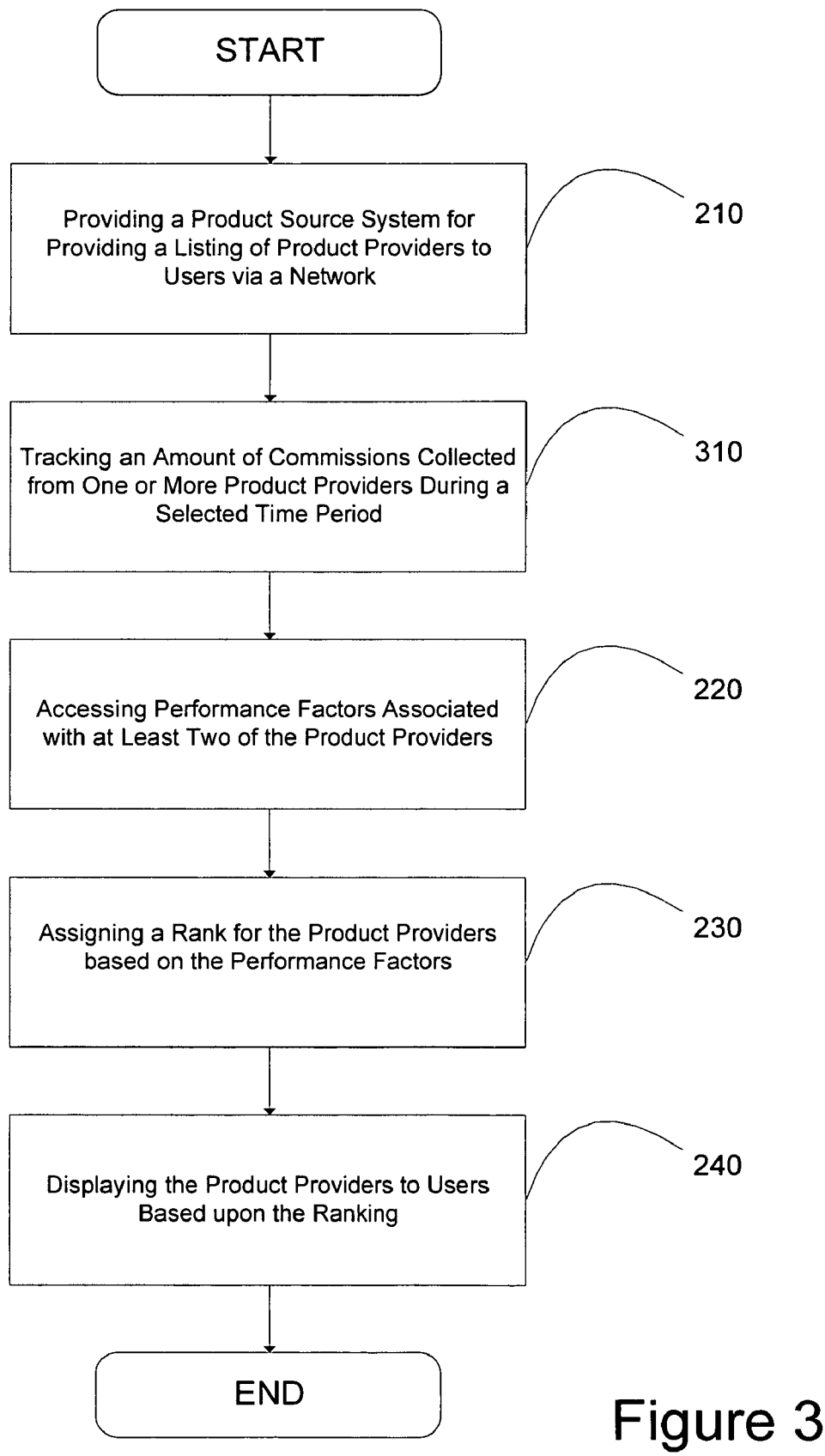

FIG. 3 is an illustration of the operation flow of the systems, methods, and computer program products in response to a user query further comprising a commissions tracking step, according to one embodiment of the present invention.

Figure 4:
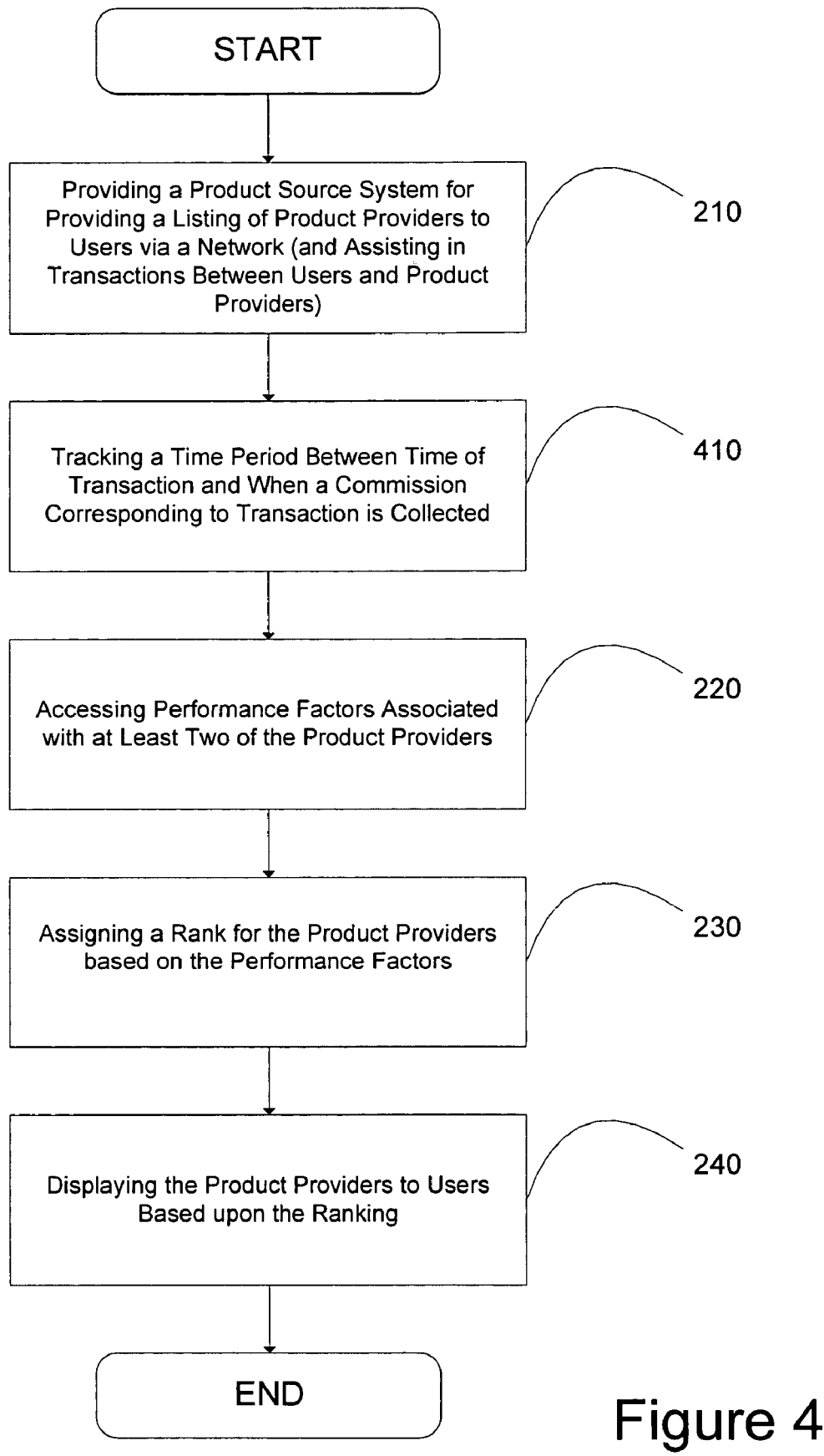

FIG. 4 is an illustration of the operation flow of the systems, methods, and computer program products in response to a user query further comprising a commissions timing tracking step, according to one embodiment of the present invention.

Figure 5:
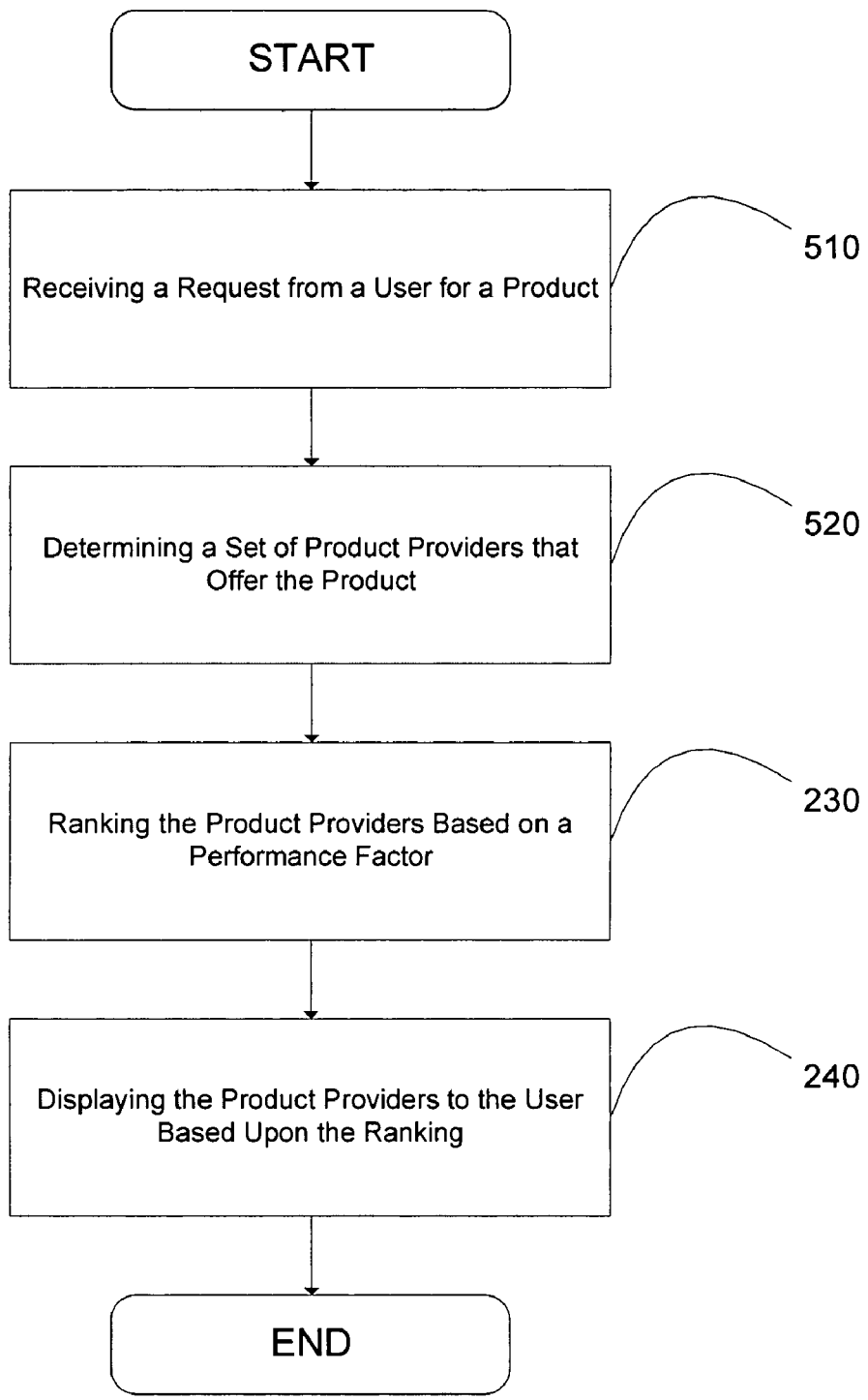

FIG. 5 is an illustration of the operation flow of the systems, methods, and computer program products in response to a user query including receiving a user request, determining a set of product providers, ranking the product providers, and display steps, according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The various aspects of the present invention mentioned above, as well as many other aspects of the invention are described in greater detail below. The systems, methods, and computer program products of the present invention are described in a hotel room reservation environment. It must be understood that this is only one example of the use of the present invention. Specifically, the systems, methods, and computer program products of the present invention can be adapted to any number of products and services and are not limited to the hotel industry. For example, the present invention may be used to rank product providers offering airline itineraries, rail and bus itineraries, cruises, restaurants, car rentals, sports events, leisure activities, etc.

FIGS. 1A and 1B illustrate an example of a network environment in which the systems, methods, and computer program products of the present invention may be employed. The network includes a host computer 12 (housing a ranking system, as described in detail below) that operates a web site or other similar customer interface for presenting a listing of product providers and product options in response to a user query. The host computer is typically connected to a network 14, such as a LAN, WAN, Intranet, or Internet, for example. Also connected to the network are various reservation systems 16 containing itineraries, fare information, and availability information for various product options offered by a group of product providers, such as hoteliers, airlines, car rental companies, etc. Further, users are also connected to the network via personal computers 18 or other types of computing systems.

The host computer 12 may thus be in communication with the reservation systems 16 (or various other product source systems) to retrieve product options (offered by a plurality of product providers) in response to a user query. Further, according to some embodiments, the host computer 12 may also be in communication with an accounting system 17 that may be capable of administering the transfer of commissions from product source systems 16 to the host computer 12 and/or collecting funds for the purchase of product options from users (via user interface 18). The accounting system 17 may also be configured to be capable of accessing data related to commission collections information or other performance data corresponding to one or more product providers.

According to the system embodiments of the present invention, the host computer 12 (and ranking system hosted therein) may be capable of accessing performance factors associated with the product providers listed in the reservation system 16. The retrieved performance factors may subsequently be utilized by the ranking system of the host computer 12 for assigning a rank for the product providers based on the performance factors. As described in further detail below, the performance factors may be based on performance scores, customer scores, and/or operator-defined values that may be input by an operator of the host computer 12.

In operation, the system of the present invention, via the host computer 12, provides a web page or other similar electronic form to the user in response to a user query. Using the web page, the user inputs a product-related query. Based on this query, the host computer, in turn, polls the reservation systems 16 to retrieve availability information for product options (such as travel itineraries) offered by one or more product providers meeting the requirements of the user query. As described above, the host computer 12 also communicates with the accounting system 17 to facilitate a user transaction (such as the purchase of a particular product option from a selected product provider).

The host computer 12 also retrieves performance factors, or data used to compile such factors, associated with the product providers from the reservation systems 16 (or from other network 14 locations as described below). The host computer 12 (and ranking system hosted therein) then assigns a rank for the product providers based on the performance factors, wherein the performance factors are based on at least a performance score and a customer score. The performance score may be based on historical data stored in the reservation system 16 or in a memory device 22 of the host computer 12 corresponding to various product providers. Such data may include, but is not limited to: a number of reservations made via the product source system by the plurality of users with each of the plurality of product providers; a number of inquiries made via the product source system by the plurality of users for each of the plurality of product providers; and other data related to the relative popularity of selected product providers with users of the system of the present invention. Furthermore, the customer score may also be based on similarly-stored historical data related to transactions between an operator of the system of the present invention and selected product providers. Such customer score data may include, but is not limited to: an amount of commissions collected from one or more of the plurality of product providers during a selected time period; a period of time between the time of the transaction and when a commission corresponding to the transaction is collected; and other data indicating the transactional and/or credit history for a particular product provider.

The host computer 12 and ranking system further assimilates the performance and customer scores to generate a performance factor and a display ranking based at least in part on the performance factor. The host computer 12 then provides a listing of product providers offering products that accommodate the user query in a web page or other electronic form to the user. The host computer 12 (in communication with a display 18 (such as a user interface PC or other computer device in communication with the network 14)), may thus display the listing of product providers to users in a particular order based on the ranking assigned by the host computer using the performance factor (and the component performance scores and customer scores).

As described above, the host computer 12 may, in some embodiments, retrieve the performance factors, or data used to compile such factors, associated with the product providers from the reservation systems 16. According to other embodiments, the host computer 12 may further comprise a memory device 22 (and data cache 30) for storing data (such as the performance scores and/or customer scores information described above) that may be used by the ranking system to generate an overall performance factor and a display ranking for product providers based on the performance factor. Furthermore, the host computer 12 may also retrieve customer score information (such average collections time) from an accounting system 17 or other tracking system.

In some embodiments, the performance factors used by the ranking system to generate a display ranking of product providers may also be further based on an operator-defined value that may be input by an operator of the host computer 12 (and ranking system) using a keyboard interface (or other user interface type) included as a component or peripheral to the host computer 12. According to such embodiments, a processor 20 of the host computer 12 may sum at least two of the performance score, customer score, and operator-defined value to determine the performance factor that is used, in turn, to generate the ranking of product providers. According to other system embodiments of the present invention, the processor 20 of the host computer 12 sums the performance score and customer score to determine the performance factor. According to other system embodiments of the present invention, the processor 20 of the host computer 12 sums a performance score, customer score, and/or one or more user and/or system-defined values to determine the performance factor. In some embodiments, for example, the system may receive a user-defined value that may be generally higher in value for product providers that allow for more profitable transactions. For example, the "driverRank" value (shown in Equation (7) below), may be used to assign a higher ranking value to product providers that offer a more substantial discount on products (such as hotel rooms) that are consigned and/or purchased directly by an operator of the system of the present invention and then re-sold to the users via the system. Such a discount may, in some instances, be defined by long-term contract between the system operator and one or more product providers such that the "driverRank" value may be user and/or operator-defined and kept generally constant for a particular product provider.

According to some embodiments, the host computer 12 (or host computing element 12) further interrogates an accounting system 17, or other tracking system (in communication with the host computer 12 and/or various reservation systems 16 via the network 14 (see FIG. 1A)) so as to be capable of accessing the customer score data described generally above, such as an amount of commissions collected (by an operator of the system of the present invention) from one or more the plurality of product providers during a selected time period. The accounting system 17 may be configured to be capable of tracking various customer score data types including, but not limited to: an amount of commissions collected from one or more the plurality of product providers during a selected time period; a time period between the time of the transaction and when a commission corresponding to the transaction is collected; and other customer score data that may be selected by an operator of the host computer 12 to compute the performance factor.

As illustrated in exploded FIG. 1B, the host computer 12 and ranking system of the present invention is generally embodied as a typical computer, server or mainframe system depending on the embodiment. They system generally includes a processing element 20, such as a microprocessor, VLSI, ASIC, etc., a storage device 22, display 24, keyboard and mouse interface 26, and a network interface 28.

In some embodiments, the host computer system 12 polls the reservation system 16, accounting system 17, and/or other network nodes for product option information, product provider information, and corresponding performance and customer score data each time a user enters a query (via a personal computer 18, for example). However, in some embodiments, such frequent requests can slow down or disrupt the reservation system 16. Further, accessing the reservation system 16 or other network locations may have an associated processing delay. For this reason, in some embodiments, the host computer 12 may further include a prepopulated cache 30 from which product option, product provider information, and performance factors corresponding to particular product providers is derived for providing product option listings in response to user requests. Specifically, as shown in FIG. 1B, the host computer system 12 of the present invention includes an availability cache 30 located in the storage device 22. The availability cache 30 is populated with various product option information and corresponding performance and customer scores needed to respond to availability requests issued by users. Further, the host computer 12 may respond with a listing of product providers that is ranked according to the performance score determined by the host computer 12 (and associated ranking system). In such embodiments, the performance score data, customer score data, and operator defined values retrieved from the availability cache 30 may also be summed or otherwise processed to generate a performance factor and display ranking, as described above, and presented to the user's personal computer 18 in a website listing wherein the product providers are listed in ranked order according to the performance factor.

It is noted here that the term customer and user may both used herein. These terms are for the most part used interchangeably. User may sometimes be used to refer to individuals or entities that maintain the system, as opposed to individuals or entities that purchase product options. Customer may sometimes be used to refer to product providers that rely on the host computer 12 to market offered product options to various users via the website generated by the host computer 12.

The various operations of the present invention may be performed either by hardware in the form of ASIC chips or other specialized hardware or by operation of software ran by a processing element. In the latter case, the storage device 22 may also further include the various computer software programs and modules used to implement the operations of the present invention.

As mentioned above and discussed in greater detail below, the systems, methods, and computer program products of the present invention provide product option availability information (including the availability of low-cost travel itineraries or other product options) to a user based on queries initiated by the user in a listing order based on the ranking generated by the ranking system. Thus, the product options may be presented to the user in a ranked order such that the most profitable and/or popular product providers are listed first. For example, the systems, methods, and computer program products of the present invention may provide display priority to product providers that exhibit a history of popularity with users and a history of positive and profitable interactions with the operator of the host computer 12.

The present invention also provides a method for ranking a plurality of product providers based on performance such that the product providers may be displayed to a user in response to a user query in order based upon the ranking. In one embodiment, shown in FIG. 2, the method comprises, in step 210, providing a product source system 16 for providing a listing of a plurality of product providers to a plurality of users via a network 14, wherein the product source system is capable of assisting in transactions between one or more of the plurality of users and one or more of the product providers. Step 220 comprises accessing performance factors associated with at least two of the product providers, and step 230 comprises assigning a rank for the product providers based on the performance factors, wherein the performance factors are based on a at least a performance score and a customer score. Further, as shown in step 240, the method further comprises displaying the product providers to users based on the ranking assigned by the assigning step (step 230). Step 240 may comprise displaying the ranked product providers in a display listing on a website (generated by a host computer 12, for example, and distributed to user interfaces 18 via a network 14).

As described above, the performance score used in the assigning step of step 230 may be computed using information that may include, but is not limited to: a number of reservations made via the product source system by the plurality of users with each of the plurality of product providers; and a number of inquiries made via the product source system by the plurality of users for each of the plurality of product providers. Furthermore, the customer score used in the assigning step (step 230) may be computed using data that may include, but is not limited to: an amount of commissions collected from one or more of the plurality of product providers during a selected time period; and a period of time between the time of the transaction and when a commission corresponding to the transaction is collected. Furthermore, the performance factor accessed in step 220 and utilized for ranking in step 230 may also be further based on an operator-defined value that may be input by an operator of the host computer 12 of the system of the present invention. The operator-defined value may thus allow the method of the present invention to be tailored to adjust the ranking of product providers based at least partially on an operator's preferences so that selected product providers may be ranked and displayed ahead of product providers that may exhibit higher raw performance and customer scores.

Referring again to FIG. 2, the assigning a rank step (step 230) may further comprise summing at least two of the performance score, customer score, and operator-defined value to determine the performance factor (and the resulting display rank). Thus, as described generally above, the method of the present invention may provide for product provider display rankings that are based both on profitability and popularity data as well as the preferences of an operator of the system of the present invention. Furthermore, in other method embodiments, the assigning a rank step of step 230, further comprises summing the performance score and customer score to determine a performance factor that is not based on operator-defined values.

FIG. 3 shows an alternate method embodiment of the present invention further comprising step 310, which comprises tracking an amount of commissions collected from one or more the plurality of product providers during a selected time period. For example, the commissions collected by an operator of the system of the present invention from one or more product providers (in payment for hosting and facilitating transactions between users and the product providers) may be tracked by a host computer 12 (see FIG. 1B, for example). In some method embodiments, the host computer 12 may access an internal memory device 22 including a data cache 30 that contains commissions data periodically collected directly from an individual product source system 16, an accounting system 17, or other tracking system configured to independently track commissions collected per product provider. Thus, the method of the present invention may provide steps for tracking commissions data corresponding to individual product providers so as to facilitate the generation of a performance factor (see step 220) and the generation of a resulting display rank (see step 230). In some embodiments, such commissions data is specifically utilized in the calculation of the customer score which is, in turn, used to generate a performance factor and resulting display rank.

FIG. 4 shows another method embodiment of the present invention further comprising step 410, which comprises tracking a time period between the time of the transaction and when a commission corresponding to the transaction is collected. For example, the method step 410 may comprise accessing an accounting system 17 or memory device 22 to determine accounting information related to accounts receivable information related to a particular product provider. For example, step 410 may comprise determining the "age" of an account receivable from a product provider based on the date a commission was invoiced or otherwise charged to the product provider by the operator of the system of the present invention. In some method embodiments, as described above, the host computer 12 may also access an internal memory device 22 including a data cache 30 that contains commissions data periodically collected directly from an individual product source system 16, an accounting system 17, or other tracking system configured to independently track the age of unpaid commission charges per product provider. Thus, the method of the present invention may provide steps for tracking commission payment reliability corresponding to individual product providers so as to enable the production of a performance factor (see step 220) and a resulting display rank (see step 230). In some embodiments, such commission payment time data is specifically utilized in the calculation of the customer score which is, in turn, used to generate a performance factor and resulting display rank.

Some embodiments of the present invention, as shown in FIG. 5, further provide a method for displaying results based on a user's query concerning a product, wherein the method first comprises receiving a request from a user for a product (see step 510) and determining a set of product providers that offer the product (as shown in step 520). This method embodiment also comprises step 230 for ranking the set of product providers based on a performance factor (as described above with respect to FIGS. 2-4. Finally, as shown in step 240 of FIG. 5, the method embodiment shown also comprises displaying the product providers to the user based on the ranking assigned by said ranking system. As described above, the ranking step of step 230 may comprise summing at least two of the performance score, customer score, and an operator-defined value to determine the performance factor. In some embodiments, step 230 may alternatively comprise summing the performance score and customer score (without the use of a separate operator-defined value) to determine a performance factor.

According to one exemplary embodiment, the ranking step (step 230) may be used to rank hotels or hotel chains based on a performance factor that is computed by summing at least two of: a performance score (corresponding to a number of reservations booked by users with a given hotel); a collections score (corresponding to a numerical representation of the hotel's reliability in paying commissions based on reservations obtained via the system of the present invention); and an operator defined value that may, in some cases be summed with the other two scores (performance and collection) or used in computing the scores themselves. For example, in some cases, hotels having no reservations information during a particular time period, a default performance score may be assigned using an operator-defined value.

The particular ranking step (step 230) described below with respect to product providers (such as hotels) may be performed by the host computer 12 (housing a ranking system) of the system embodiments of the present invention. Thus, the host computer may access (via the network 14) accounting systems 17, memory devices 22, reservation systems 16, or other network locations in communication with the ranking system, in order to obtain the data required to generate the performance scores, collections scores, and operator-defined values that are, in turn, used to generate the ranking in step 230. In one example, the overall performance factor (and resulting ranking) may be computed by summing performance score and customer score as follows:

$$\text{Performance Factor} = \text{Performance Score} + \text{Customer Score} \quad (1)$$

The performance score may be based, in some embodiments, on an individual hotel's (or other product provider's) reservation count for the past 6 months, from highest to lowest. This count may be stored by individual reservation systems 16, in the data cache 30 of the memory device 22 of the host computer 12, or at another network 14 location that is accessible by the host computer 12. In some embodiments, the host computer 12 may "grade" hotel's to determine the performance score based on the number of reservations obtained during a selected time period relative to peer product providers (such as other hotels listed by the host computer 12). For example, the hotels may receive performance scores according to the following percentage cutoffs:

top 15%=>"A";
next 15.01% to 45%=>"B";
45.01 to 75%=>"C";
75.01% and up=>"D";
Hotels without reservation=>"F"; and
Hotel entered into system less than 6 months=>"X".

Further, the host computer 12 of the present invention may also equate the letter grades to numerical scores in order to generate a performance score that may be summed or otherwise manipulated to generate an overall performance factor and ranking. For example, the following numerical scores may be assigned based on the "letter" grades above:

'A'='0';
'B'='1';
'C'='2';
'D'='5';
'F'='6'; and
'X'='2'.

In such examples, an operator-defined value (stored, for example, in the data cache 30 of the host computer 12) may be used to assign a numerical performance score to hotels that are either newly added to the pool of product providers (i.e., hotels entered into the system within the time period used to calculate the performance score ("X" hotels)). Thus, an operator of the system of the present invention may choose to increase the numerical performance score associated with a grade of "X" in order to rank such new hotels higher in the overall display (see step 240) so as to encourage users to purchase product options from such new product providers.

Furthermore, as discussed generally above, the overall performance factor used to rank the hotels may also be based on a customer score that captures the commissions and profitability performance of a particular hotel (or other product provider). For example, the customer score may be calculated using three separate criteria, that may include, but are not limited to: how reliably the hotel pays commissions and, how quickly the hotel pays commissions. These criteria may be combined in a ratio to generate a final customer score. First, a hotel collections ratio (HCR) is determined. In addition, an overall average of how long it takes hotels to pay commissions (Average Days to Pay ratio (ADPR) after the product use is determined (for example, on average it may take 53 days for a system operator to be paid a commission on a reservation).

The HCR portion of the customer score is calculated by the actual commissions collected (ACC) for a selected time period (one year, for example) divided by the expected commissions (ECC) for the selected time period. The ECC is the sum of the total commission rate for one year multiplied by the overall average for commissions paid percent. In order to calculate the ADPR, an average time it takes a hotel to pay a commission is divided by an overall average days to pay. The HCR and ADPR ratios are combined to generate the customer score, which is, in turn, used along with the performance score to generate the hotel ranking sort and the display ranking listed in step 240 to the user in response to a user query.

The following example illustrates the calculation of the customer score (as well as the calculation of the component HCR and ADPR ratios). First, an average commission percent (ACP) is calculated. The ACP is based on the average commission percent collected for bookings for all hotels over a selected time period (such as a one-year period). For some bookings, a 5% commission is charged, but, for others a 10%, commission is charged. These variable commission percents are averaged to make up the ACP. For example, the ACP for a given one year time period may be 6.127%.

Next, an expected commission collected (ECC) is calculated based on the total rate for 1 years worth of bookings, multiplied by the ACP. For example, if a particular hotel had two reservations for the one year period which generated a total room rate of $150.00. Thus, the ECC could be calculated by multiplying the total room rate by the ACP, or:

$$ECC = \$150.00 \times 6.127\% = \$9.20 \quad (2)$$

In the next step, an actual commissions collected (ACC) value may be calculated based on the actual total commissions collected from the hotels for the same year span. In the above example, the hotel may only pay a commission on one reservation, yielding an ACC of only $4.55. Using the ACC and ECC values, a particular hotel's (or other product provider's) overall collections ration (HCR) may be calculated to determine how well the hotel has met expectations to pay the commissions as follows:

$$\text{Hotels Collections Ratio } (HCR) = ACC/ECC \quad (3)$$

Thus, using values from example above, the HCR may be calculated as follows:

$$HCR = \$4.55/\$9.20 = 0.494565 \quad (4).$$

In order to complete the determination of the overall customer score, the average days to pay ratio (ADPR) may be calculated based upon on paid commissions for 1 year for reservations made via the host computer 12 of the present system, in order to determine how long it takes a hotel (or other product provider) (on average) to remit commissions payment to the operator of the system. This information may be obtained by interrogating historical payment data or accounts receivable data from an accounting system 17 or from collections data stored in a data cache 30 of the host computer 12. The ADPR is calculated by comparing the average days to pay (ADP) for all hotels to the hotel ADP (HADP) average for the individual hotel (or other product provider) in question. For example, if the ADP (for all hotels) is 53 days, and the HADP (corresponding to the hotel in question) is 66 days, then the ADPR may be calculated as follows:

$$\text{Average Days to Pay Ratio }(ADPR) = ADP/HADP \quad (5)$$

Thus, in the above example, the ADPR may be calculated as: ADPR=53/66=0.80303

Finally, in order to generate the overall customer score, a weighted sum of the ADPR and the HCR may be calculated. For example, in one embodiment, the customer score may be calculated by adding the ADPR (with 25% weight) and the HCR (with 75% weight), to obtain the overall customer score. The weight percentages may be adjusted in various embodiments to emphasize and/or de-emphasize the average days to pay and/or hotel collections ratio in the calculation of the customer score. The customer score calculation is shown below:

$$\text{Customer Score} = (ADPR \times 0.25) + (HCR \times 0.75) \quad (6)$$

$$\text{Customer Score} = (0.80303 \times 0.25) + (0.494565 \times 0.75)$$
$$= 0.57168125$$

The customer score may also be converted to a "letter" grade scale as shown below, in order to make the customer score more easily comparable to the performance score above to generate the overall ranking (see step 230). For example, the raw customer score may be converted to a "letter" grade as follows:

A=>1.45-99999999999;
B=>1.20-1.44999999999;
C=>0.75-1.19999999999;
D=>0.50-0.74999999999; and
F=>0.0-0.4999999999.

In this exemplary embodiment, the ranking step (step 230) may be completed by generating a real-time ranking (based upon a rolling 12-month average that may be used to yield customer scores). For example, a new ranking for each hotel (or other product provider) may be generated using the following formula:

$$\text{New Hotel Ranking} = (\text{driverRank} + \text{performance score} + \text{sortRank} + \text{customer score}) \quad (7)$$

The "driverRank" value may comprise, in some embodiments, a value of 1-10 assigned to a product provider (i.e., a hotel, hotel chain, and/or hotel room wholesale reseller) who sells product (such as hotel rooms) directly to the search system operator for resale. Thus, "driverRank" may be an operator-defined value such that higher values (8-10) correspond to product providers that provide product to the search system operator at a significant discount that may be defined by a long-term contract, for example (such that the profit margin for sale of the product to users is larger). The hotels (and/or other product providers) are sorted so that the highest score is merchandised at the top of the display and lower scores are placed at the bottom in the display step (step 240 discussed above). Furthermore, according to some embodiments, the overall ranking may also take into account an operator-defined value (i.e., the "sortRank" value shown above in order to generate a higher (or lower) display ranking for one or more selected product providers.

According to various embodiments of the present invention, the manner in which the components of "New Hotel Ranking" (see Equation (7), above) may be adjusted to emphasize and/or deemphasize certain components of the ranking. For example, because direct resale of product (such as hotel rooms) is often less complex and more profitable than collecting commissions from hotels based on bookings received via the search system, the present invention (or a user thereof) may choose to emphasize "driverRank" in computing the New Hotel Ranking (see Equation (7)). This may be accomplished, in some embodiments, by multiplying the performance score, "sortRank," and/or "customer score" by a selected decimal and/or ratio to deemphasize these components of the overall "New Hotel Ranking" relative to product providers having a high "driverRank" value.

In addition to providing apparatus and methods, the present invention also provides computer program products for performing the operations described above. The computer program products have a computer readable storage medium having computer readable program code means embodied in the medium. With reference to FIG. 1B, the computer readable storage medium may be part of the storage device 22, not shown, and may implement the computer readable program code means to perform the above discussed operations.

In this regard, FIGS. 2-5 are block diagram illustrations of methods, systems and program products according to the invention. It will be understood that each block or step of the block diagram and combinations of blocks in the block diagram can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
a processor of a ranking system configured to communicate with a product source system for receiving a listing of a plurality of product providers, the product source system being configured to assist in transactions between one or more of a plurality of users and one or more of the product providers,
wherein the processor is configured to access performance factors associated with at least two of the listed product providers and assign a ranking for the respective product providers based on the performance factors, wherein the performance factors are based on at least a performance score and a customer score, wherein for each of at least some of the product providers, the performance score relates to at least one transaction between the product provider and one or more of the plurality of users, and the customer score relates to at least one transaction between the product provider and the product source system, wherein the customer score used by the processor is selected from the group consisting of:
an amount of commissions collected from one or more of the plurality of product providers during a selected time period;
a period of time between the time of the transaction and when a commission corresponding to the transaction is collected; and
combinations thereof; and
wherein the processor is configured to communicate with a display for displaying the product providers to users based on the ranking assigned by the processor.

2. The apparatus according to claim 1, wherein the performance score used by said ranking system is selected from the group consisting of:
a number of reservations made via the product source system by the plurality of users with each of the plurality of product providers;
a number of inquiries made via the product source system by the plurality of users for each of the plurality of product providers; and
combinations thereof.

3. The apparatus according to claim 1, wherein the performance factors are further based on an operator-defined value.

4. The apparatus according to claim 3, wherein said ranking system sums at least two of the performance score, customer score, and operator-defined value to determine a performance factor.

5. The apparatus according to claim 1, wherein said ranking system sums the performance score and customer score to determine a performance factor.

6. The apparatus according to claim 1 further comprising a tracking system for tracking the amount of commissions collected from the one or more of the plurality of product providers during a selected time period.

7. The apparatus according to claim 1 further comprising a tracking system for tracking the time period between the time of the transaction and when the commission corresponding to the transaction is collected.

8. A method comprising:
communicating with a product source system for receiving a listing of a plurality of product providers, the product source system being configured to assist in transactions between one or more of a plurality of users and one or more of the product providers;
accessing performance factors associated with at least two of the listed product providers;
assigning a ranking for the respective product providers based on the performance factors, wherein the performance factors are based on at least a performance score and a customer score, wherein for each of at least some of the product providers, the performance score relates to at least one transaction between the product provider and one or more of the plurality of users, and the customer score relates to at least one transaction between the product provider and the product source system, and wherein the customer score used by the assigning step is selected from the group consisting of:
an amount of commissions collected from one or more of the plurality of product providers during a selected time period;
a period of time between the time of the transaction and when a commission corresponding to the transaction is collected; and
combinations thereof; and
communicating with a display for displaying the product providers to users based on the ranking assigned by the assigning step,
wherein the communicating with a product source system, accessing performance factors, assigning a ranking and communicating with a display steps are performed by a processor.

9. A method according to claim 8, wherein the performance score used by said assigning step is selected from the group consisting of: a number of reservations made via the product source system by the plurality of users with each of the plurality of product providers; a number of inquiries made via the product source system by the plurality of users for each of the plurality of product providers; and combinations thereof.

10. A method according to claim 8, wherein the performance factors are further based on an operator-defined value.

11. A method according to claim 10, wherein said assigning step sums at least two of the performance score, customer score, and operator-defined value to determine a performance factor.

12. A method according to claim 8, wherein said assigning step sums the performance score and customer score to determine a performance factor.

13. A method according to claim 8 further comprising tracking the amount of commissions collected from the one or more of the plurality of product providers during a selected time period.

14. A method according to claim 8 further tracking the time period between the time of the transaction and when the commission corresponding to the transaction is collected.

15. A computer program product comprising a computer-readable storage medium having computer-readable program code portions stored therein, the computer-readable program code portions comprising:
a first executable portion configured to communicate with a product source system for receiving a listing of a plurality of product providers, the product source system being configured to assist in transactions between one or more of a plurality of users and one or more of the product providers;

a second executable portion configured to access performance factors associated with at least two of the listed product providers;

a third executable portion configured to assign a ranking for the respective product providers based on the performance factors, wherein the performance factors are based on at least a performance score and a customer score, wherein for each of at least some of the product providers, the performance score relates to at least one transaction between the product provider and one or more of the plurality of users, and the customer score relates to at least one transaction between the product provider and the product source system, and wherein the customer score used by the third executable portion is selected from the group consisting of:

an amount of commissions collected from one or more of the plurality of product providers during a selected time period;

a period of time between the time of the transaction and when a commission corresponding to the transaction is collected; and combinations thereof; and a fourth executable portion configured to display the product providers to users based on the ranking assigned by the third executable portion.

16. A computer program product according to claim 15, wherein the performance score used by said fourth computer instruction means is selected from the group consisting of: a number of reservations made via the product source system by the plurality of users with each of the plurality of product providers; a number of inquiries made via the product source system by the plurality of users for each of the plurality of product providers; and combinations thereof.

17. A computer program product according to claim 15, wherein the performance factors are further based on an operator-defined value.

18. A computer program product according to claim 17, wherein said fourth computer instruction means sums at least two of the performance score, customer score, and operator-defined value to determine a performance factor.

19. A computer program product according to claim 15, wherein said fourth computer instruction means sums the performance score and customer score to determine a performance factor.

20. A computer program product according to claim 15, further comprising an executable portion for tracking the amount of commissions collected from the one or more of the plurality of product providers during a selected time period.

21. A computer program product according to claim 15, further comprising an executable portion for tracking the time period between the time of the transaction and when the commission corresponding to the transaction is collected.

22. An apparatus comprising:

a processor of a ranking system configured to communicate with a product source system connected to a plurality of product providers, the product source system being configured to receive a request for a product from a user and determine a set of product providers that offer the product, wherein the processor is configured to rank the set of product providers based on a performance factor, wherein the performance factor is based on at least a performance score and a customer score, wherein for each of at least some of the product providers, the performance score relates to at least one transaction between the product provider and one or more of the plurality of users, and the customer score relates to at least one transaction between the product provider and the product source system, wherein the customer score used by the processor is selected from the group consisting of:

an amount of commissions collected from one or more of the plurality of product providers during a selected time period;

a period of time between the time of the transaction and when a commission corresponding to the transaction is collected; and combinations thereof; and wherein the processor is configured to communicate with a display for displaying the product providers to the user based on the ranking assigned by the processor.

23. The apparatus according to claim 22, wherein the performance score used by said ranking system is selected from the group consisting of: a number of reservations made via the product source system by the plurality of users with each of the plurality of product providers; a number of inquiries made via the product source system by the plurality of users for each of the plurality of product providers; and combinations thereof.

24. The apparatus according to claim 22, wherein the performance factors are further based on an operator-defined value.

25. The apparatus according to claim 24, wherein said ranking system sums at least two of the performance score, customer score, and operator-defined value to determine a performance factor.

26. The apparatus according to claim 22, wherein said ranking system sums the performance score and customer score to determine a performance factor.

27. A method comprising:

communicating with a product source system, the product source system being configured to receive a request from a user for a product, and determine a set of product providers that offer the product;

ranking the set of product providers based on a performance factor, wherein the performance factor is based on a at least a performance score and a customer score, wherein for each of at least some of the product providers, the performance score relates to at least one transaction between the product provider and one or more of the plurality of users, and the customer score relates to at least one transaction between the product provider and the product source system, and wherein the customer score used by the ranking step is selected from the group consisting of:

an amount of commissions collected from one or more of the plurality of product providers during a selected time period;

a period of time between the time of the transaction and when a commission corresponding to the transaction is collected; and combinations thereof; and communicating with a display for displaying the product providers to the user based on the ranking assigned by the ranking step, wherein the communicating with a product source system, ranking the set of product providers and communicating with a display are performed by a processor.

28. A method according to claim 27, wherein the performance score used by said ranking step is selected from the group consisting of: a number of reservations made via the product source system by the plurality of users with each of the plurality of product providers; a number of inquiries made via the product source system by the plurality of users for each of the plurality of product providers; and combinations thereof.

29. A method according to claim 27, wherein the performance factors are further based on an operator-defined value.

30. A method according to claim 29, wherein said ranking step sums at least two of the performance score, customer score, and operator-defined value to determine a performance factor.

31. A method according to claim 27, wherein said ranking step sums the performance score and customer score to determine a performance factor.

32. A computer program product comprising a computer-readable storage medium having computer-readable program code portions stored therein, the computer-readable program code portions comprising:

a first executable portion configured to communicate with a product source system, the product source system being configured to receive a request from a user for a product, wherein the first executable portion is also configured to determine a set of product providers that offer the product;

a second executable portion configured to rank the set of product providers based on a performance factor, wherein the performance factor is based on a at least a performance score and a customer score, wherein for each of at least some of the product providers, the performance score relates to at least one transaction between the product provider and one or more of the plurality of users, and the customer score relates to at least one transaction between the product provider and the product source system, and wherein the customer score used by the second executable portion is selected from the group consisting of:

an amount of commissions collected from one or more of the plurality of product providers during a selected time period;

a period of time between the time of the transaction and when a commission corresponding to the transaction is collected; and combinations thereof; and a third executable portion configured to display the product providers to the user based on the ranking assigned by the second executable portion.

33. A computer program product according to claim 32, wherein the performance score used by said third computer instruction means is selected from the group consisting of: a number of reservations made via the product source system by the plurality of users with each of the plurality of product providers; a number of inquiries made via the product source system by the plurality of users for each of the plurality of product providers; and combinations thereof.

34. A computer program product according to claim 32, wherein the performance factors are further based on an operator-defined value.

35. A computer program product according to claim 34, wherein said third computer instruction means sums at least two of the performance score, customer score, and operator-defined value to determine a performance factor.

36. A computer program product according to claim 32, wherein said third computer instruction means sums the performance score and customer score to determine a performance factor.

* * * * *

UNITED STATES PATENT AND TRADEMARK OFFICE
CERTIFICATE OF CORRECTION

PATENT NO. : 7,580,868 B2 Page 1 of 1
APPLICATION NO. : 11/232064
DATED : August 25, 2009
INVENTOR(S) : Fabris et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 934 days.

Signed and Sealed this

Fourteenth Day of December, 2010

David J. Kappos
*Director of the United States Patent and Trademark Office*